UNITED STATES PATENT OFFICE.

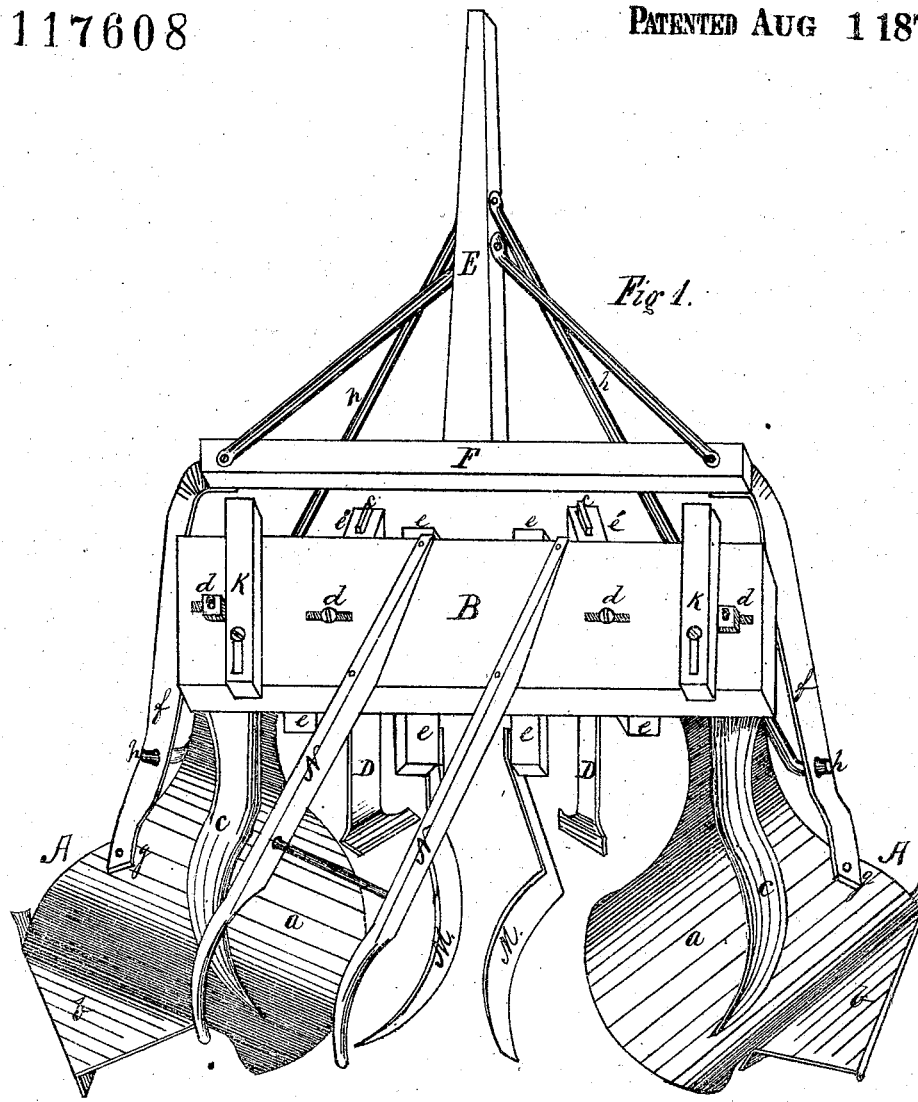

SIMON A. CUMMINS, OF VIENNA, NEW JERSEY.

IMPROVEMENT IN PLOWS.

Specification forming part of Letters Patent No. 117,608, dated August 1, 1871.

*To all whom it may concern:*

Be it known that I, SIMON A. CUMMINS, of Vienna, county of Warren and State of New Jersey, have invented certain new and useful Improvement in Plows; and I do hereby declare the following to be a full, clear, and exact description thereof, sufficient to enable those skilled in the art to make and use the same, reference being had to the accompanying drawing making part of this specification, in which—

Figure 1 is a perspective view. Fig. 2 is a detached view of the guards. Fig. 3 is a detached view of the colter.

The nature of my invention relates to an improved plow, constructed for the purpose of eradicating weeds on both sides of a row of corn, potatoes, or other similar cultivated vegetable productions; and consists of two cultivator-plows, adjustably arranged side by side at suitable distances apart, which, acting in combination with adjustable front colters and rear guards, combine to produce the above-desired result. It consists, also, in the manner of attaching the tongue directly to the mold-board of the plow by means of arms, which depend from the ends of the cross-piece of the tongue, and fastened at the lower ends to the mold-board, thus giving a free up-and-down motion to the tongue.

Referring to the drawing, A A may represent the plows, made right and left, and placed at suitable distances apart, with their land-sides facing toward each other. The mold-boards $a$ $a$ are formed of sheet or cast metal, having their lower edges bent or turned outward at right angles, and are provided with points $b\,b$, which are also placed right and left, and are formed of steel or other metal, and are bolted to the bottom of the horizontal turned portion of the mold-boards $a\,a$. $c\,c$ are braces of wood or iron, serving to stiffen and hold in place the mold-boards $a\,a$. B is the main frame, provided with a number of slots or openings, $d\,d\,d\,d$, through which the shanks of the mold-boards $a\,a$ pass, and are secured in place by nuts. The adjustable bars $e\,e$ and $e'\,e'$, which carry the guards M M and colters D D, fastened by nuts, also have their bearing upon this slotted main frame. When it is desired to increase or decrease the distance between the plows these nuts are loosened, and the plows A A, guards M M, and colters D D are placed in the requisite position, when the nuts may again be tightened, thus securing them firmly in place. The colters D D, formed of cast or other metal, are constructed with their lower edges turned outward, the more effectually to stir up and agitate the weeds and soil, while the upper portions have two slots or openings, $c\,c$, through which suitable screws or bolts fasten them to the bars $e\,e$, thereby allowing the colters D D to be raised or lowered, in order to accommodate them to the soil. M M are guards, preferably of sheet or plate metal, cut in the form of an elbow, with their lower edges curved outward to prevent the soil from falling on the plants, while their upper edges are arranged and combined as the colters D D, and are for the same purpose, as above described. E is an ordinary tongue, to the rear of which is fastened a cross-piece, F, from the ends of which depend bent arms of iron or other suitable metal, and are pivoted to the side of the mold-board at or about the points $g\,g$, said arms being strengthened by braces $h\,h$. By this arrangement the tongue is given an easy up-and-down motion, and, at the same time, assists to regulate the depth of the furrow. To the main frame B are attached slotted bars K K by means of screws or bolts, which are designed to be moved backward or forward so as to strike against the cross-bar F, so as to raise or lower the tongue E, thereby regulating the depth of the furrow. N N are handles, bolted diagonally to the top of the main frame B, thus permitting the plowman to walk between the plants.

It will be observed that, while in operation, the plows go astride the plants, which pass through and between the colters D D in front and guards M M behind, while the plow on either side turns up the soil and throws it inward, the guards M M preventing it from falling on and breaking plants, and also smoothing it down as the plow advances.

Having thus described my invention, what I claim as new, and desire to secure by Letters Patent, is—

1. The arrangement of the slotted frame B, adjustable plows A A, adjustable colters D D, bars $e'\,e'$, guards M M, and bars $e\,e$, substantially as and for the purpose set forth.

2. The adjustable bars $e\,e$ and curved guards M M, in combination with the slotted main frame B and plows A A, combined and operating substantially as set forth.

3. The tongue E, cross-bar F, and thill-irons $f$, in combination with the plows A A, frame B, and adjusting-bars K K, substantially as and for the purpose set forth.

4. The tongue E, cross-bar F, coupling $f$, and braces $h\ h$, in combination with the plows A A, main frame B, and adjustable bars K K, substantially as and for the purpose specified.

To the above specification I have signed my name this 6th day of June, A. D. 1871.

SIMON A. CUMMINS.

Witnesses:
   U. H. HOWELL,
   JOHN MERRELL.